2,872,409

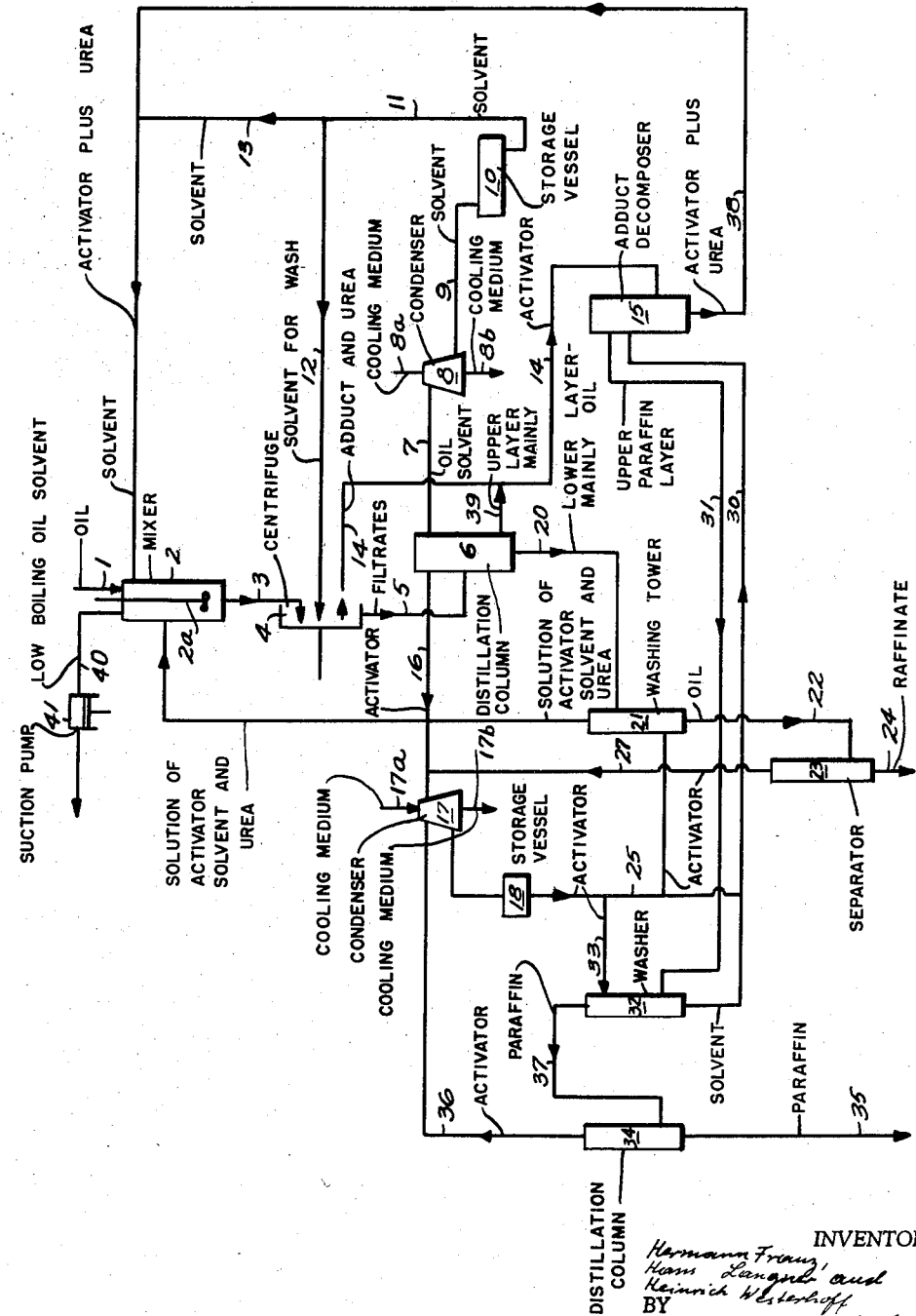

METHOD OF SEPARATING n-PARAFFINS FROM HYDROCARBONS

Hermann Franz, Hans Langner, and Heinrich Westerhoff, Frankfurt am Main, Germany, assignors to Edeleanu Gesellschaft m. b. H., Frankfurt am Main, Germany, a corporation of Germany Application September 21, 1954, Serial No. 457,400

Claims priority, application Germany September 23, 1953

5 Claims. (Cl. 208—25)

The present invention relates to a process of separating normal paraffins from hydrocarbon mixtures by treating them with urea or solutions of urea in a suitable solvent. In this treatment the n-paraffins are precipitated in the form of a crystalline complex, the so-called adduct, consisting of urea and n-paraffins. The adduct thus formed is separated from the remaining liquid, for example, by filtering or centrifuging and is then decomposed by being treated with water, steam, solvents, by heating, or the like. Thus, on the one hand, the free normal paraffins are obtained, and on the other hand, the urea is recovered which can be used again in the process as a complex forming agent.

The oil separated from the adduct is freed from the urea or the urea solution dissolved therein, for instance, by washing it with water.

For the sake of simplicity the mixture freed from the adduct by mechanical means is called filtrate or oil filtrate, regardless of whether it was obtained from the reaction mixture by filtration or centrifuging. The oil which is free of n-paraffins is called the raffinate.

As solvents for urea such materials are used which easily dissolve the urea but practically do not mix with the hydrocarbons, such as water, alcohol, and the like. Although urea forms adducts with n-paraffins in the absence of such solvents, these will, when present, activate the adduct formation by accelerating and completing it. Such solvents therefore are usually called "activators."

The treatment of hydrocarbon oils with urea is applied whenever the quality of the respective oils is affected by their n-paraffin content. This applies to fuels in which the n-paraffins are either undesirable because of their low octane rating, or to diesel oils, in which n-paraffins are especially desirable because of their high ignition quality, or to lubricating oils, the pour point of which depends essentially upon their content of straight-chained paraffins.

When using urea or a urea solution for treating viscous oils or wax-containing oils, such treatment results in a paste or mash which is difficult to separate from the oil. The oil free from adduct has a satisfactory pour point, but its yield is very small, whereas the paraffin-urea adduct contains very large amounts of oil having a low pour point in an occluded state which can be washed out only with difficulty. Therefore, in such cases it has been suggested to carry out the treatment with urea in the presence of liquids which dissolve the wash oil mixture from which the paraffin is to be removed, but do not dissolve the urea, and which do not form adducts with urea. Such a treatment produces highly liquid mixtures from which the adduct can be easily separated by filtration or centrifuging.

Solvents for dissolving the hydrocarbon mixtures, i. e. oil solvents, are especially the low-molecular and branched aliphatic and aromatic hydrocarbons such as iso-octane or benzene, or organic halogen compounds such as carbon tetrachloride, or hydrocarbon chlorides.

The use of the hydrocarbon chlorides known as dewaxing solvents with selective properties, such as methylene chloride, dichlorethane, and the like, have been found especially suitable. The separation obtained by using these selective solvents is considerably better than when using as diluents such solvents as benzene, which have no distinct selectivity with respect to different groups of hydrocarbons.

The process as above-described shows a very simple way of separating from the hydrocarbon mixtures those n-paraffins which differ from other hydrocarbons by their special chemical and physico-chemical properties. However, this process has previously not been satisfactory either with regard to its economy, or with regard to the production of the n-paraffins in a pure state from the adduct. Furthermore, the recovery of the urea, and its removal, as well as the removal of the activator and the oil solvent from the filtrates, and also a suitable circulation of the solvent require a series of auxiliary operations which increase the expense of the process.

It is therefore one of the objects of the present invention to simplify the entire process of separating n-paraffins from hydrocarbons by forming urea complexes. A feature of the invention for obtaining this object resides in the combined application of several special means for performing the different steps of the whole process.

One feature of the invention resides in the use of such oil solvents which have a lower boiling point than the activator, i. e. the solvent used for dissolving the urea. After separating the urea adduct from the oil solution, this feature permits the oil solvent to be evaporated with the result that the remaining mixture of oil and solvent will be split up into two layers. One of these layers is the so-called activator layer and essentially consists of the activator, excessive urea, and small amounts of hydrocarbons and oil solvent, whereas the other layer primarily consists of hydrocarbons with a small amount of activator, and traces of urea and oil solvent.

According to the invention, the activator layer as such is used for decomposing the separated adduct into urea and n-paraffins, whereby two liquid phases are again formed, one of which in turn consists essentially of activator and urea. Since this layer has, in addition, taken up the urea which had previously been bound to the adduct, it thus contains the main quantity of the urea introduced into the process and may then be reused for the formation of adducts. Thus, the invention permits the circulation of a part of the reaction participants and solvents without requiring any special energy-consuming measures for recovering the same, and they may be reused practically in the same composition in which they have separated from the filtrate as a liquid layer.

The ratio of oil solvent to activator may be so adjusted that the formation of the adduct will proceed in a homogeneous phase. Preferably, however, a ratio of oil solvent to the activator is applied in which the formation of the adduct occurs in a heterogeneous, liquid system. If, for example, a spindle oil fraction is diluted with approximately 150% by volume of oil solvent (with reference to the oil applied), the liquid phase remains homogeneous if up to 75% by volume of activator is being added. If the amount of oil solvent is reduced while maintaining the amount of activator, a separation into layers will occur at about 120% by volume of oil solvent. The formation of a heterogeneous, liquid phase system is further dependent upon the composition of the fraction to be treated, i. e. upon its contents in paraffins, olefins, naphthenes, and aromatics, as well as upon their boiling range, insofar as oils rich in paraffins, and more highly molecular oils tend to form layers more easily than mixtures which are low in paraffinic hydrocarbons, and which consists of lower molecular constituents.

When treating lubricating oils for the purpose of producing oils having a low pour point, it has been found especially suitable to use methanol as an activator and methylene chloride as an oil solvent. Methylene chloride and methanol is a ratio of 85:15 form an azeotropic mixture which boils at about 40° C. Methylene chloride with hydrocarbon oils containing paraffins is perfectly miscible at the temperatures applied in forming the adduct. The good dissolving action which the methylene chloride has under such temperatures upon paraffins, unfavorably influences the equilibrium in the adduct formation

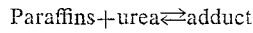
Paraffins+urea⇌adduct

Although this proportion of methylene chloride in such azeotropic mixture does not cause noticeable quantities of paraffin to remain dissolved therein which might possibly increase the pour point, such azeotropic mixture is perfectly suitable for washing out the adduct from any non-paraffin components of the mixture which adhere to it.

The following manner of carrying out the process according to the invention has been found to be especially suitable:

A mixture of a paraffin-base oil, urea, oil solvent, and activator in the desired composition is thoroughly stirred by means of a stirring device having a very high speed (approx. 10,000 R. P. M.) for about 30 seconds, when the adduct formation is completed.

The reaction mixture is then separated by centrifuging in the following manner: the oil is thrown off, and the washing filtrate is introduced into a column wherein the oil solvent is evaporated. The condensed oil solvent partly serves as a washing agent for the adduct, and partly passes into the mixer for diluting the starting oil.

After driving off the oil solvent, the remaining mixture as above-described forms two layers, i. e. an activator layer which primarily consists of activator containing the unused urea as well as a very small quantity of oil and oil solvent in solution, and an oil layer essentially consisting of the raffinate with a small amount of activator, still smaller amounts of oil solvent, and traces of urea.

The activator layer is then separated and fed into the adduct decomposer. There the adduct is stirred up with the activator at about 80° C. whereby the adduct decomposes and when settling again forms two layers, i. e. a paraffin layer containing small amounts of activator and urea, and the activator layer. The latter now contains, in addition, the urea which had previously been bound in the adduct, as well as a small amount of paraffin. This activator layer may again be added to the hydrocarbon mixture to be treated, and reused for forming the adduct.

The process according to the invention will now be illustrated with reference to the accompanying drawing by an example describing its application to a paraffin-base, lubricating-oil fraction in which methylene chloride has been used as oil solvent and methanol as activator.

Referring to the drawing, for example, 100 parts by volume of a hydrocarbon mixture are compounded in a mixer 2 with 65 parts by weight of urea, 100 parts by volume of methanol, and 65 parts by volume of methylene chloride.

The oil to be treated enters through a conduit 1 into the mixer 2 where it comes into contact with the urea, the methanol, and the methylene chloride. A stirring device 2a, having a very high speed, mixes the reaction products very thoroughly and effects the adduct formation within the shortest possible time. The mixture then passes through a conduit 3 into a centrifuge 4 in which the oil components which do not participate in forming the adduct are thrown off. The solid mass consisting of adduct and urea is then washed with the azeotropic mixture of methylene chloride and methanol.

The main filtrate and the washing filtrate then pass together through a conduit 5 into the column 6, where the lower boiling oil solvent or the azeotropic mixture of methylene chloride and methanol is distilled off and then passes through conduit 7 into the condenser 8 where it is precipitated. Conduits 8a and 8b are used for supplying and discharging the cooling medium. The condensed solvent then passes through conduit 9 into the storage vessel 10 from which a part of the solvent is supplied as diluent through the conduits 11 and 13 into the mixer 2. The remaining part flows from the vessel 10 through conduits 11 and 12 to the centrifuge 4. If desired or necessary, the final washing filtrates may be passed directly to the mixer 2 for prediluting the starting oil.

After evaporating the azeotropic mixture, a small portion of the activator will be distilled off in the column 6, such portion being subsequently required for washing the oil and the paraffin. It passes through conduit 16 into the condenser 17 and thence into the storage vessel 18. The conduits 17a and 17b are used for supplying and discharging the cooling medium.

After driving off the oil solvent, two layers form in the column 6 which is specially designed for this purpose.

The lower layer consisting of oil and small amounts of urea, solvent, and activator is drawn from the column 6 through conduit 20 into the washing tower 21 where, by means of the activator, methylene chloride and urea which were retained in the oil are washed out, the activator being supplied from the storage vessel 18 through conduit 25, while the solution of activator, solvent, and urea passes from the washing tower 21 through conduit 26 into the mixer 2. The oil still containing activator passes through conduit 22 to the separator 23, where the activator is removed by distillation (or washing, or in any other usual manner) and from where it is then returned through conduit 27 and the condenser 17 to the storage vessel 18. The finished oil, i. e. the raffinate, is withdrawn through conduit 24.

The upper layer in the column system 6 consists mainly of activator and also contains the main portion of the urea which has gone into solution but has not participated in the adduct formation, while the oil content thereof is low. This solution of activator, urea, and oil is passed through conduits 39 and 14 into the adduct decomposer 15. The washed solid mass consisting of adduct and urea is passed from the centrifuge 4 through conduit 14 into the adduct decomposer 15, where the adduct is decomposed at 80 to 100° C. by means of the solution of activator and urea produced in column 6 by layer formation. Two liquid layers are thus formed; and the upper paraffin layer which still contains small amounts of urea and activator then passes through conduit 31 into the washer 32 where it is washed with activator which is supplied from container 18 through conduits 25 to 33. The washing solvent containing a small amount of urea is then returned through conduit 30 to the adduct decomposer 15.

The paraffin from which the urea has been removed and which still contains a small amount of activator is passed from the washing tower 32 through the conduit 37 into column 34 where the activator which is dissolved in the paraffin is distilled off, the vapors passing through conduit 36 and the condenser 17 to the storage vessel 18, whereas the paraffin is withdrawn through conduit 35 to a suitable storage tank (not shown).

The lower layer in the decomposer 15 contains, dissolved in activator, the urea accumulated during the decomposition of the adduct and the washing of the paraffin, and it is returned as a clear solution through conduit 38 into the mixer 2.

When mixing the oil entering from conduit 1 into the mixer 2 with the solution of urea, activator, and oil, which has been returned from the washing of the oil in the washing tower 21 through conduit 26, and the oil solvent entering from container 10 through conduits 11 and 13, a temperature is produced which is higher than desirable for the adduct formation. By removing the low boiling oil solvent through conduit 40 by means of a suction pump 41, the most desirable temperature of 40° C. will be set up.

The plant as above-described may also be used in a similar manner for separating n-paraffins from other fractions of hydrocarbon oils.

*Example*

100 parts by volume of a spindle oil of central European origin were dissolved in 75 parts by volume of a mixture of 65 parts by volume of methylene chloride and 10 parts by volume of methanol. This solution was mixed at a temperature of 35° C. with 90 parts by volume of methanol and 65 parts by weight of urea (with respect to the starting oil). This treatment resulted in the formation of a crystalline adduct which was separated by centrifuging it from the oil solvent mixture. The adduct was washed with 50 parts by volume of a mixture of methylene chloride and methanol of the composition as mentioned above.

The centrifuged liquid contained 82 parts by volume of those hydrocarbons which do not form adducts with urea, as well as 118 parts by volume of the azeotropic mixture, approximately 90 parts by volume of methanol and 9 parts by weight of unreacted urea. From this mixture the main part of the solvents was distilled off in the following ratio: approximately 115 parts by volume of the azeotropic mixture were evaporated and condensed, and the additional 20 parts by volume of methanol were distilled off. After settling, two layers were formed in the remaining mixture.

The upper layer thus formed consisted of approximately 70 parts by volume of methanol with 9 parts by weight of urea dissolved therein, 0.5 part by volume of oil and traces of methylene chloride. This layer was introduced into a vessel for decomposing the adduct.

This layer was washed in a washer with 10 parts by volume of methanol for removing the traces of urea contained therein. After washing was completed, the washing liquid contained the urea and 3 parts of the azeotropic mixture, apart from the 10 parts by volume of methanol. This washing mixture was recycled for the treatment of fresh spindle oil, whereas the washed oil was passed into a storage tank.

The adduct was decomposed at 70° C. by the diluted urea solution as mentioned above. Two layers were formed, the upper layer essentially consisting of the n-paraffins, and the lower layer of urea dissolved in methanol. The two layers were then separated and the n-paraffins of the upper layer were washed with 10 parts by volume of methanol for removing the urea. The washing liquid was then likewise recycled, whereas the paraffins were freed from the residual methanol by heating and then stored in a storage tank.

The lower layer obtained by decomposing the adduct then contained the entire urea which had been a part of the adduct, as well as the unreacted urea which has been washed out of the paraffin, apart from 10 parts by volume of methanol and 7 parts of the azeotropic mixture. This entire mixture was then likewise recycled for the treatment of fresh spindle oil.

The yield and quality of the starting oil and the final products appear from the following table:

|  | Spindle | n-Paraffins | Raffinate (Oil free of n-paraffins) |
|---|---|---|---|
| Spec. Gravity at 60° C | 0.851 |  |  |
| Melting Point, ° C | +19 |  |  |
| Viscosity Engler at 50° C | 1.77 |  |  |
| Yield in weight—percent |  | 18 | 82 |
| Spec. Gravity at 20° C |  |  | 0.890 |
| Pour Point, ° C |  |  | −32 |
| Freezing Point, ° C |  | +38 |  |

While the foregoing description sets forth in detail what we regard as the preferred embodiments of our invention, it is to be understood that numerous changes may be made therein without departing from the spirit and scope of the invention as defined in the appended claims.

Having thus described our invention, what we claim as new is:

1. In a method of separating n-paraffins from hydrocarbon mixtures containing the same and also containing other hydrocarbons, the steps of mixing said hydrocarbon mixture with a solution of urea, in excess of the amount necessary for adduct formation with the n-paraffins, dissolved in a solvent which is an activator therefor and with a solvent for said other hydrocarbons, said solvent for said other hydrocarbons having a boiling point below the boiling point of said activator solvent for said urea, so as to cause reaction between said n-paraffins and said urea to form a crystalline adduct thereof, thereby forming a reaction mixture including said adduct, said other hydrocarbons dissolved in said solvent therefor and also including excess urea; separating said crystalline adduct from said reaction mixture; evaporating said solvent for said other hydrocarbons from said reaction mixture at a temperature below the boiling point of said activator solvent for said urea, thereby forming a two-layer residue, one of said layers consisting essentially of said other hydrocarbons and being substantially free of n-paraffins and the other of said layers consisting essentially of said activator solvent for said urea and excess urea; separating said other of said layers from said one of said layers; and decomposing said adduct into urea and n-paraffins whereby all of the n-paraffins are substantially completely separated from the other hydrocarbons and substantially all of the urea used in the separation is recovered.

2. In a method of separating n-paraffins from hydrocarbon mixtures containing the same and also containing other hydrocarbons, the steps of mixing said hydrocarbon mixture with a solution of urea, in excess of the amount necessary for adduct formation with the n-paraffins, dissolved in a solvent which is an activator therefor and with a chlorinated hydrocarbon as solvent for said other hydrocarbons, said chlorinated hydrocarbon solvent for said other hydrocarbons having a boiling point below the boiling point of said activator solvent for said urea, so as to cause reaction between said n-paraffins and said urea to form a crystalline adduct thereof, thereby forming a reaction mixture including said adduct, said other hydrocarbons dissolved in said chlorinated hydrocarbon solvent therefor and also including excess urea; separating said crystalline adduct from said reaction mixture; evaporating said chlorinated hydrocarbon solvent for said other hydrocarbons from said reaction mixture at a temperature below the boiling point of said activator solvent for said urea, thereby forming a two-layer residue, one of said layers consisting essentially of said other hydrocarbons and being substantially free of n-paraffins and the other of said layers consisting essentially of said solvent for said urea and exces urea; separating said other of said layers from one of said layers; and decomposing said adduct into urea and n-paraffns whereby all of the n-paraffins are substantially completely separated from the other hydrocarbons and substantially all of the urea used in the separation is recovered.

3. In a method of separating n-paraffins from hydrocarbon mixtures containing the same and also containing other hydrocarbons, the steps of mixing said hydrocarbon mixture with a solution of urea, in excess of the amount necessary for adduct formation with the n-paraffins, dissolved in methanol which is an activator therefor and with methylene chloride as solvent for said other hydrocarbons, said methylene chloride having a boiling point below the boiling point of said methanol, so as to cause reaction between said n-paraffins and said urea to form a crystalline adduct thereof, thereby forming a reaction mixture including said adduct, said other hydrocarbon oils dissolved in said methylene chloride and also including excess urea; separating said crystalline adduct from said reaction mixture; evaporating the azeotropic mixture of methylene chloride and methanol from said reaction mixture until substantially all of said methylene chloride is removed therefrom, thereby forming a two-layer residue, the lower of said layers consisting essentially of said other hydrocarbons and being substantially free of n-paraffins and the upper of said layers consisting essentially of methanol and excess urea; separating said layers from each other; and decomposing said adduct into urea and n-paraffins whereby all of the n-paraffins are substantially completely separated from the other hydrocarbons and substantially all of the urea used in the separation is recovered.

4. In a method of separating n-paraffins from hydrocarbon mixtures containing the same and also containing other hydrocarbons, the steps of mixing said hydrocarbon mixture with a solution of urea, in excess of the amount necessary for adduct formation with the n-paraffins, dissolved in a solvent which is an activator therefor and with a solvent for said other hydrocarbons, said solvent or said other hydrocarbons having a boiling point below the boiling point of said activator solvent for said urea, so as to cause reaction between said n-paraffins and said urea to form a crystalline adduct thereof, thereby forming a reaction mixture including said adduct, said other hydrocarbons dissolved in said solvent therefor and also including excess urea; separating said crystalline adduct from said reaction mixture; evaporating said solvent for said other hydrocarbons from said reaction mixture at a temperature below the boiling point of said activator solvent for said urea, thereby forming a two-layer residue, one of said layers consisting essentially of said other hydrocarbons and being substantially free of n-paraffins and the other of said layers consisting essentially of said activator solvent for said urea and excess urea; separating said other of said layers from said one of said layers; mixing said other of said layers with said crystalline adduct so as to decompose said adduct into urea which is dissolved by said activator solvent and n-paraffins; separating the thus formed urea solution from said n-paraffins; washing said n-paraffins with additional solvent for urea; and recovering substantially pure urea, n-paraffins and said other hydrocarbons whereby all of the n-paraffins are substantially completely separated from the other hydrocarbons and substantially all of the urea used in the separation is recovered.

5. In a method of separating n-paraffins from hydrocarbon mixtures containing the same and also containing other hydrocarbons, the steps of mixing said hydrocarbon mixture with a solution of urea, in excess of the amount necessary for adduct formation with the n-paraffins, dissolved in a solvent which is an activator therefor and with a dewaxing solvent selective for said other hydrocarbons, said solvent for said other hydrocarbons having a boiling point below the boiling point of said activator solvent for said urea, so as to cause reaction between said n-paraffins and said urea to form a crystalline adduct thereof, thereby forming a reaction mixture including said adduct, said other hydrocarbons dissolved in said solvent therefor and also including excess urea; separating said crystalline adduct from said reaction mixture; evaporating said selective solvent for said other hydrocarbons from said reaction mixture at a temperature below the boiling point of said activator solvent for said urea, thereby forming a two-layer residue, one of said layers consisting essentially of said other hydrocarbons and the other of said layers consisting essentially of said activator solvent for said urea and excess urea; separating said other of said layers from said one of said layers; and decomposing said adduct into urea and n-paraffins whereby all of the n-paraffins are substantially completely separated from the other hydrocarbons and substantially all of the urea used in the separation is recovered.

References Cited in the file of this patent

UNITED STATES PATENTS

| | | |
|---|---|---|
| 1,988,706 | Swift | Jan. 22, 1935 |
| 2,499,820 | Fetterly | Mar. 7, 1950 |
| 2,569,984 | Fetterly | Oct. 2, 1951 |
| 2,627,513 | Arey | Feb. 3, 1953 |
| 2,640,051 | Lynch | May 26, 1953 |
| 2,681,303 | Anderson et al. | June 15, 1954 |
| 2,735,843 | Weedman | Aug. 21, 1956 |